Jan. 7, 1936.　　　　R. I. BATES　　　　2,026,769
VALVE FOR SHOCK ABSORBERS
Filed May 11, 1934

INVENTOR
RALPH I. BATES
BY
ATTORNEYS

Patented Jan. 7, 1936

2,026,769

UNITED STATES PATENT OFFICE 2,026,769

VALVE FOR SHOCK ABSORBERS

Ralph I. Bates, Dayton, Ohio, assignor to General Motors Corporation, Detroit, Mich., a corporation of Delaware Application May 11, 1934, Serial No. 725,062

4 Claims. (Cl. 277—61)

This invention relates to improvements in hydraulic shock absorbers and particularly to the fluid flow control devices therefor.

It is among the objects of the present invention to provide a fluid flow control device for a hydraulic shock absorber of simple structure and design, capable of providing a dual fluid pressure flow relief from the fluid displacement chamber of the shock absorber.

A further object of the present invention is to provide a fluid flow control device for a hydraulic shock absorber which will operate quietly while restricting flows of fluid from the fluid displacement chamber of the shock absorber.

Further objects and advantages of the present invention will be apparent from the following description, reference being had to the accompanying drawing wherein a preferred embodiment of one form of the present invention is clearly shown.

Figure 1:
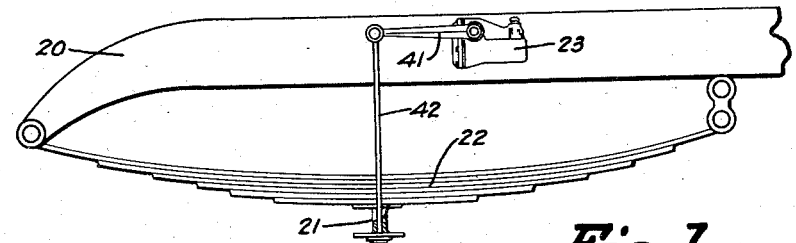
Fig. 1 is a fragmentary side view of a vehicle chassis showing a shock absorber equipped with the present invention applied thereto, the wheels of the vehicle having been omitted for the sake of clearness.
Figure 2:
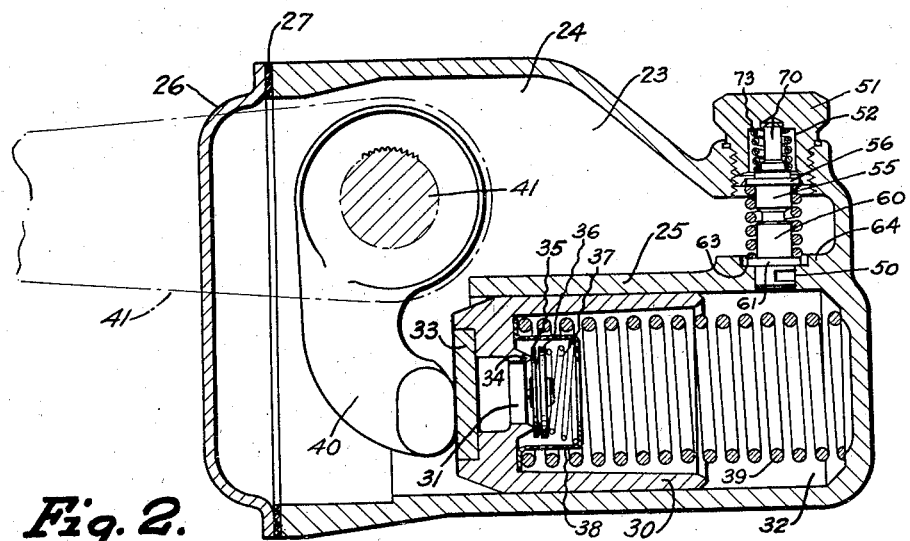
Fig. 2 is a longitudinal sectional view taken through the shock absorber, the fluid flow control device being shown in elevation for the sake of clearness.

Referring to the drawing, the numeral 20 designates the frame of the vehicle which is supported upon the axle 21 by springs 22, only one being shown.

The shock absorber comprises a casing 23 providing a fluid reservoir 24 and a cylinder 25, the cylinder being within the casing of the shock absorber. A cover plate 26 closes the open end of the casing 23, a gasket 27 being clamped between the cover and casing to prevent fluid leaks.

Within the cylinder there is provided a piston 30 having a passage 31 through its head portion which connects the fluid displacement chamber 32, formed in the cylinder by the piston 30, with the fluid reservoir 24 and thus provides for the transfer of fluid between the chamber and reservoir. A wearplate 33 is secured in the head of the piston, said wear-plate not closing the passage 31 in the piston head. An annular ridge 34 is provided in the inner surface of the piston head which ridge 34 surrounds the port or passage 31 in the piston head and forms a seat for the valve 35. The valve 35 is a flexible disc supported and carried by a rigid disc 36, which rigid disc is urged toward the seat 34 by a spring 37 interposed between the disc 36 and a cage 38. It may be seen that the effect of pressure of the spring 37 upon the disc 36 will maintain the flexible disc 35 in engagement with the seat 34. The cage 38 is maintained in engagement with the inner surface of the piston head by a spring 39, one end of which engages the end wall of the cylinder 25, this spring 39 thus urging the piston 30 so that its wearpiece 33 is substantially maintained in constant engagement with the free end of the rocker lever 40 which is attached to a cross shaft 41 journalled in the casing 23. One end of this cross shaft 41 extends to the outside of the shock absorber and has the operating arm 41 secured thereto. The free end of this arm is swivelly secured to one end of a link 42, the opposite end of which is attached to the axle 21 in any suitable manner.

From the aforegoing it may be seen that when the spring and axle 22 and 21 respectively are forced toward the frame 20 in response to the roadwheels of the vehicle striking an obstruction in the roadway, the link 42 and arm 40 will cause shaft 41 to be rotated clockwise, thus arm 40 is moved away from the open end of the cylinder and spring 39 will consequently cause the piston 30 to follow the movement of the arm and thus move toward the open end of the cylinder 25. This movement of the piston causes the fluid in the reservoir 24 to move the intake valve consisting of discs 35 and 36 away from the seat 34 against the effect of spring 37, thereby permitting a substantially unrestricted flow of fluid from the reservoir through the piston passage 31 into the fluid displacement chamber 32. Reverse movement of the axle and springs 21 and 22 respectively, as the spring tends to return to normal load position, will result in a reverse movement of the shaft 41 and its arm 40, more specifically, it will result in a counter-clockwise movement of these elements, thereby causing the piston 30 to be moved into the cylinder or, toward the closed end thereof, thus exerting a pressure upon the fluid therein. In response to this pressure upon the fluid in this chamber 32 it will be urged through the port 50 in the wall of the cylinder 25 which port connects the displacement chamber 32 with the reservoir 24.

The present invention relates to a fluid flow control device for controlling the fluid flow from the chamber 32 through the port 50 into the reservoir 24 in response to the movement of the piston 30 toward the closed end of the cylinder 25. This fluid flow control device comprises a screw plug 51, threadedly received in an opening in the casing spaced from, but in direct alignment with the port 50. This screw plug is interiorly recessed as at 52, the inner end of the plug being counterbored, which counterbore has a sloping edge as at 53. In the end of the screw plug 51 so counterbored, a plurality of radial slots 54 are provided for purposes to be described.

A tubular member 55 has a head portion 56 which seats into the counterbore in the end of the screw plug 51. This tubular member 55 is in direct axial alignment with the port 50, however, the end of said tubular member adjacent the port is spaced therefrom, this end of said tubular member having a restricted throat portion 57 providing an orifice which restricts the fluid flow through said tubular member.

Figures 3, 4, 5:
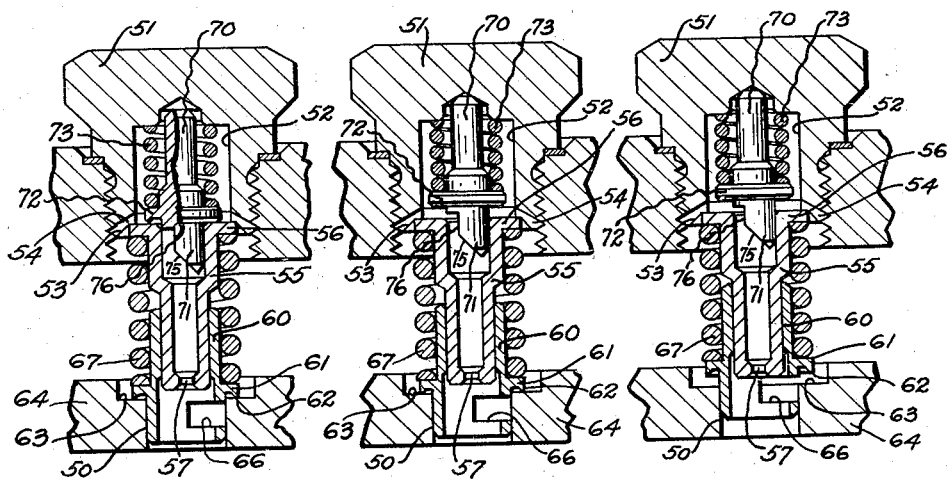
Fig. 3 is an enlarged longitudinal sectional view taken through the fluid flow control device of the shock absorber, showing the device in normal position.
Fig. 4 is a view similar to Fig. 3, showing the fluid flow control device in a position in which it will establish the first fluid relieving flow from the displacement chamber.
Fig. 5 is a view similar to Figs. 3 and 4 showing the fluid flow control device in a position in which both fluid relieving flows are established from the fluid displacement chamber.

As may be seen in Figs. 3, 4 and 5 respectively the end of the tubular member 55 adjacent the port 50 is of reduced diameter. Upon this reduced diameter portion of the tubular member 55 a pressure release valve 60 is slidably carried, this pressure release valve having an outwardly extending flange 61 provided with a depending annular ridge 62 which is adapted to seat upon a flat surface 63 provided in the wall 64 of the cylinder 25. In the present instance this flat surface is the bottom of an annular recess formed in this wall 64 and concentric with the port 50. The valve 60, as will be noted, is hollow, the cylindrically shaped end thereof extending beyond the flanged portion of the valve slidably fitting into the port 50. An opening 66 on one side of said cylinder portion of the valve fitting into said port 50 provides for a side discharge of the fluid through said valve 60 when it is moved into the position as shown in Fig. 5, as will be described detailedly hereinafter.

A coil spring 67 is interposed between the tubular member 55 and the valve 60, said spring engaging both of said members, yieldably urging the valve 60 so that its annular ridge 62 is yieldably maintained in engagement with the surface 63 of the cylinder wall and rigidly holding the tubular member 55 in proper position in the counterbore provided in the end of screw plug 51 in which position the tubular member 55 is in axial alignment with the port 50.

This fluid flow control device includes also a second spring-loaded valve 70 having an end 71 which fits into the end of the tubular member 55 more remote from the port 50. An outwardly extending flange 72 on the valve 70, engages the end surface of the tubular member 55 and is yieldably maintained in such engagement by a spring 73 interposed between the valve flange 72 and the inner, bottom wall of the recess 52 in the screw plug 51.

The portion 71 of the valve 70 extending into the tubular member 55 has a sloping surface 75 and a cut-away portion 76 on its one side, both cut-away portions 76 and the sloping surface 75 being normally within the confines of the tubular member 55. When valve 70 is lifted as shown in Fig. 4, the fluid flow through the tubular member 55 past the valve portion 71 will impinge against the sloping surface 75 and the wall of the cut-away portion 76, thereby urging the valve 70 to one side of the tubular member 55 and consequently eliminating chattering of the valve which chattering is undesirable inasmuch as it causes noises in the shock absorber which are greatly amplified due to the fact that the shock absorber is secured to the frame of the vehicle, said frame acting as a sounding board and thus greatly amplifying these shock absorber noises.

The fluid flow control device just described functions in the following manner:

As has been said before, movement of the piston 30 toward the closed end of cylinder 25 exerts a pressure upon the fluid therein and urges it to exit through the port 50. At a predetermined low pressure of the fluid flow through said port 50, the flow passing through valve 60 past and through the orifice 57 in the tubular member 55, will urge valve 70 from engagement with the end surface of the tubular member 55 so that it will be moved from its normal position as shown in Fig. 3 into the first fluid pressure relieving flow position as shown in Fig. 4. Now the flow from the tubular member 55 will continue past valve 70 into the recess of the screw plug 51 thence through the radial slots 54 therein to the reservoir 24. Valve 70 provides a certain restriction to this fluid flow and consequently the movement between the frame and axle of the vehicle is resisted accordingly. If the separating movement of these two elements of the vehicle is particularly pronounced or violent, a comparatively higher pressure upon the fluid within the chamber 32 results and consequently a greater fluid pressure will be exerted upon the fluid flow control device. In response to this increased fluid pressure, valve 60 will be moved to slide upon the tubular member 55 against the effect of spring 67, and as a result of this movement, said valve will assume the position as shown in Fig. 5. Now a greater part of the fluid flowing through the port 50 is directed through the side opening 66 in the valve 60 and exits to the reservoir 24 around the tubular member 55 instead of through it, as is the case during the first pressure relieving flow. Under these circumstances two pressure relieving flows are established from the port 50, one through the tubular member 55 past the valve 70, this flow being restricted by this valve, the second through the port 50 and side openings 66 of valve 60 around the tubular member 55 to the reservoir 24, this flow being restricted by the valve 60. These restrictions to the fluid flow will naturally cause the shock absorber to offer a resistance to the return movement of the spring 22 to its normal load position, this resistance being in accordance with the force of the returning spring to its normal load position or the upward movement of the vehicle frame in response to an upward thrust.

From the aforegoing it may be seen that applicant has provided a fluid flow control device of comparatively few parts and simple structure and design, capable of controlling the discharge of fluid flow from the fluid displacement chamber under pressure and thus controlling the movement of the two relatively movable members, namely the axle and frame of the vehicle between which the shock absorber is connected.

While the embodiment of the present invention constitutes a preferred form, it is to be understood that other forms might be adopted, all coming within the scope of the claims which follow.

What is claimed is as follows:

1. A fluid flow control device, comprising, in combination, a stationary tubular member; a valve slidably supported upon said tubular member and directing all of the fluid flow from the port into said tubular member; a spring interposed between the said valve and tubular member yieldably urging the valve into normal position and holding the tubular member rigidly in proper aligned position relatively to the port; and a spring-loaded valve normally closing the end of said tubular member opposite the port.

2. A fluid flow control device, comprising, in combination, a stationary tubular member axially aligned with the port but having its end spaced therefrom; a valve slidably carried by said tubular member, said valve normally engaging the body of the shock absorber surrounding said port for directing fluid from said port into said tubular member; a spring engaging both the valve and the tubular member, yieldably urging the valve into normal position and rigidly holding the tubular member in aligned and spaced position relatively to the port; and a spring-loaded valve normally closing the end of the tubular member more remote from the port.

3. A fluid flow control device, comprising, in combination, a stationary tubular member, one end of which coaxially aligns with but is spaced from the port; a spring loaded, unbalanced valve normally closing the other end of said tubular member; an unbalanced valve slidably carried by the tubular member and normally closing the space between the one end of the said member and the port; and a spring yieldably urging the last mentioned valve into normal position and holding the tubular member in its proper position relatively to the port.

4. A fluid flow control device, comprising, in combination, a stationary tubular member coaxially aligned with said port, the one end of said member being spaced from said port and being of lesser diameter than the port, thereby providing an annular space between it and the port; a spring loaded unbalanced valve normally closing the other end of the tubular member; an unbalanced sleeve valve slidably carried by the tubular member and normally closing the annular space between said member and port; and a spring urging the sleeve valve into normal position and holding the tubular member in its proper position relatively to the port.

RALPH I. BATES.